(12) United States Patent
Huang

(10) Patent No.: US 6,645,266 B2
(45) Date of Patent: Nov. 11, 2003

(54) AIR PURIFIER

(75) Inventor: Ping Huang, Tainan Hsien (TW)

(73) Assignee: Hung Hsing Electric Co., Ltd., Tainan Hsien (TW)

(*) Notice: Subject to any disclaimer, the term of this patent is extended or adjusted under 35 U.S.C. 154(b) by 99 days.

(21) Appl. No.: 09/983,137

(22) Filed: Oct. 23, 2001

(65) Prior Publication Data

US 2003/0074871 A1 Apr. 24, 2003

(51) Int. Cl.$^7$ .............................. B01D 50/00; H02P 7/00
(52) U.S. Cl. ........................ 55/471; 55/506; 55/508; 55/486; 55/DIG. 34; 96/397; 96/417; 96/421; 439/640; 439/654
(58) Field of Search ................... 55/471, 385.1, 55/438, 439, DIG. 36, 506, 508, 486, 491, DIG. 34; 96/224, 397, 416, 417, 421; 439/640, 654, 650, 540.1, 701, 569

(56) References Cited

U.S. PATENT DOCUMENTS 6,214,074 B1 * 4/2001 Beier et al. ............ 55/DIG. 36
6,296,522 B1 * 10/2001 Ho .......................... 439/640
6,340,926 B1 * 1/2002 Chu .......................... 361/104
6,419,378 B1 * 7/2002 Wedell et al. ............. 362/431
6,428,351 B1 * 8/2002 Turner et al. ............. 439/701
6,461,396 B1 * 10/2002 Baker et al. ................ 55/471
6,494,940 B1 * 12/2002 Hak ........................... 55/471

* cited by examiner

Primary Examiner—Duane Smith
Assistant Examiner—Minh-Chau T. Pham
(74) Attorney, Agent, or Firm—Rosenberg, Klein & Lee

(57) ABSTRACT

An air purifier has a housing, a motor, a fan, a filtering net, and a power plug. The motor and the fan are positioned in the housing. The filtering net is joined to the front of the housing. The power plug includes a rotatable member and a pair of conductive members; the conductive members have ring-shaped portions concentrically arranged in a chamber of the housing, and are electrically connected to the motor; the rotatable member is rotatably received in the chamber, and has a pair of copper strips, which stick out at outer ends for connection with a power socket, and which constantly touch a respective one of the concentric ring-shaped portions from inner ends in the rotation of the rotatable member for adjustment of the position of the air purifier.

7 Claims, 5 Drawing Sheets

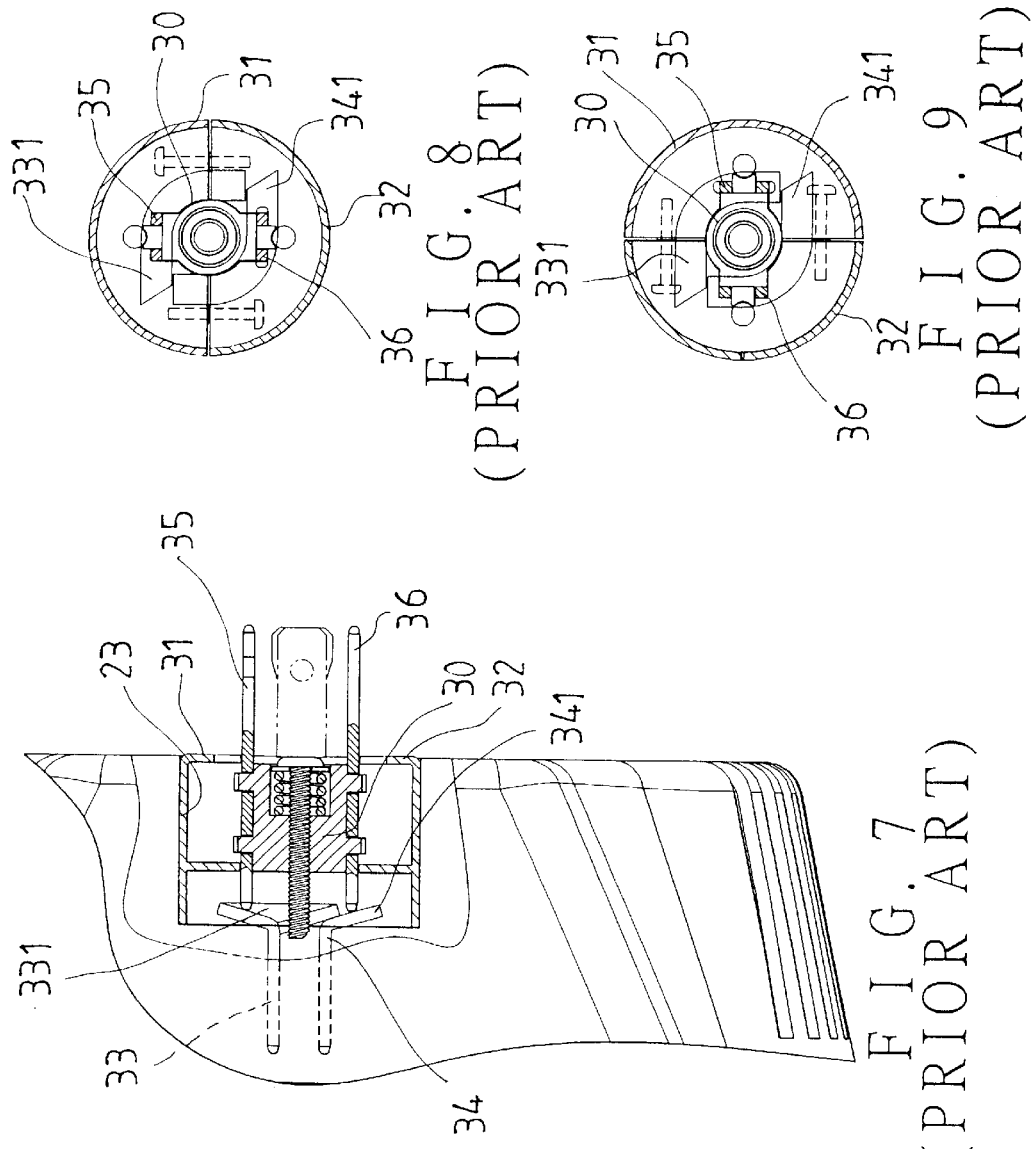

AIR PURIFIER

BACKGROUND OF THE INVENTION

The present invention relates to an air purifier, and more particularly, to an air purifier, of which the plug is rotatably fitted to the main housing.

Air purifiers takes many forms such as a common large one, which is positioned on the floor and has a wire used for connecting the motor to the power supply, and a small-sized one, which has a plug directly connected to the main housing without the use of a wire. Because the wire of the common air purifier is likely to cause people to trip over it accidentally and the air purifier would take too much space in the house, the small-sized one is getting more and more popular.

Referring to FIG. 6, a conventional small-sized air purifier has a main body 1, an air outlet grille 12, a filtering net 11, a motor 21, a fan 22, a rear housing 2 and a power plug 3.

The air outlet grille 12, and the filtering net 11 are secured to the front of the main body 1. The motor 21 is also secured to the main body 1, and is connected to the fan 22 from a rotatable shaft (not numbered). The rear housing 2 is joined to the rear side of the main body 1.

The power plug 3 includes a pair of copper strips 35 and 36, a shaft 30, a casing consisting of two half parts 31 and 32, and a pain of conductors 33 and 34. The copper strips 35 and 36 are joined to the shaft 30, and the half parts 31 and 32 of the casing are connected to each other to house the shaft 30 therein with two ends of each of the copper strips 35 and 36 sticking out therefrom. Referring to FIG. 7, the casing is rotatably received in a chamber 23 of the rear housing 2, and the conductors 33 and 34 are secured to the bottom wall of the chamber 23; the conductors 33 and 34 each has a straight portion projecting into the rear housing 2 so as to be electrically connected to the motor 21. The conductors 33 and 34 each further has a conductive portion 331 and 341 abutting the bottom wall of the chamber 23, the conductive portions 331 and 341 are each formed with an L-shape to get into contact with one of the copper strips 35 and 36.

The motor 21 can be activated when the outer ends of the copper strips 35 and 36 are plugged into the power socket; thus, air can be forced to travel through the net 11 to be purified. The casing joined to the copper strips 35 and 36 can be turned relative to the rear housing 2 before the copper strips 35 and 36 are plugged into the socket, so as to permit the position of the air purifier to be adjusted according to the need. However, referring to FIGS. 8 and 9, the range of the adjustment is limited to an angle of about 90°, i.e. when the power plug 3 is turned clockwise from the position of FIG. 8, it must not be turned for more than 90°, otherwise the copper strips 35 and 36 each will get into contact with both of the L-shaped conductive portions 331, 341 of the conductors 33 and 34 to cause a shortcircuit. Therefore, the air purifier is not ideal from the view point of safety.

SUMMARY OF THE INVENTION

Therefore, it is a main object of the present invention to provide an air purifier, of which the power plug can be rotated to any position without the risk of causing a shortcircuit.

The air purifier has a motor, a fan, a main body, a rear housing, and a filtering net like the one in the Background, and is provided with a power plug of the present invention.

The power plug includes a rotatable member and a pair of conductive members. The conductive members have ring-shaped portions concentrically arranged in a chamber of the housing, and have straight portions projecting into the housing form the ring-shaped portions so as to be electrically connected to the motor. The rotatable member is rotatably received in the chamber, and has a pair of copper strips, which stick out at outer ends for connection with a power socket, and which constantly touch a respective one of the ring-shaped portions from inner ends in the rotation of the rotatable member.

Thus, the air purifier can be turned to any orientation relative to the copper strips without the risk of causing a shortcircuit.

BRIEF DESCRIPTION OF THE DRAWINGS

The present invention will be better understood by reference to the accompanying drawings, wherein:

FIG. 7 is a cross-sectional view of the air purifier in the Background.

FIG. 8 is a cross-sectional view of the power plug in FIG. 7 in the rotating movement.

FIG. 9 is another cross-sectional view of the power plug in FIG. 7 in the rotating movement.

DETAILED DESCRIPTION OF THE PREFERRED EMBODIMENT

Figure 1:
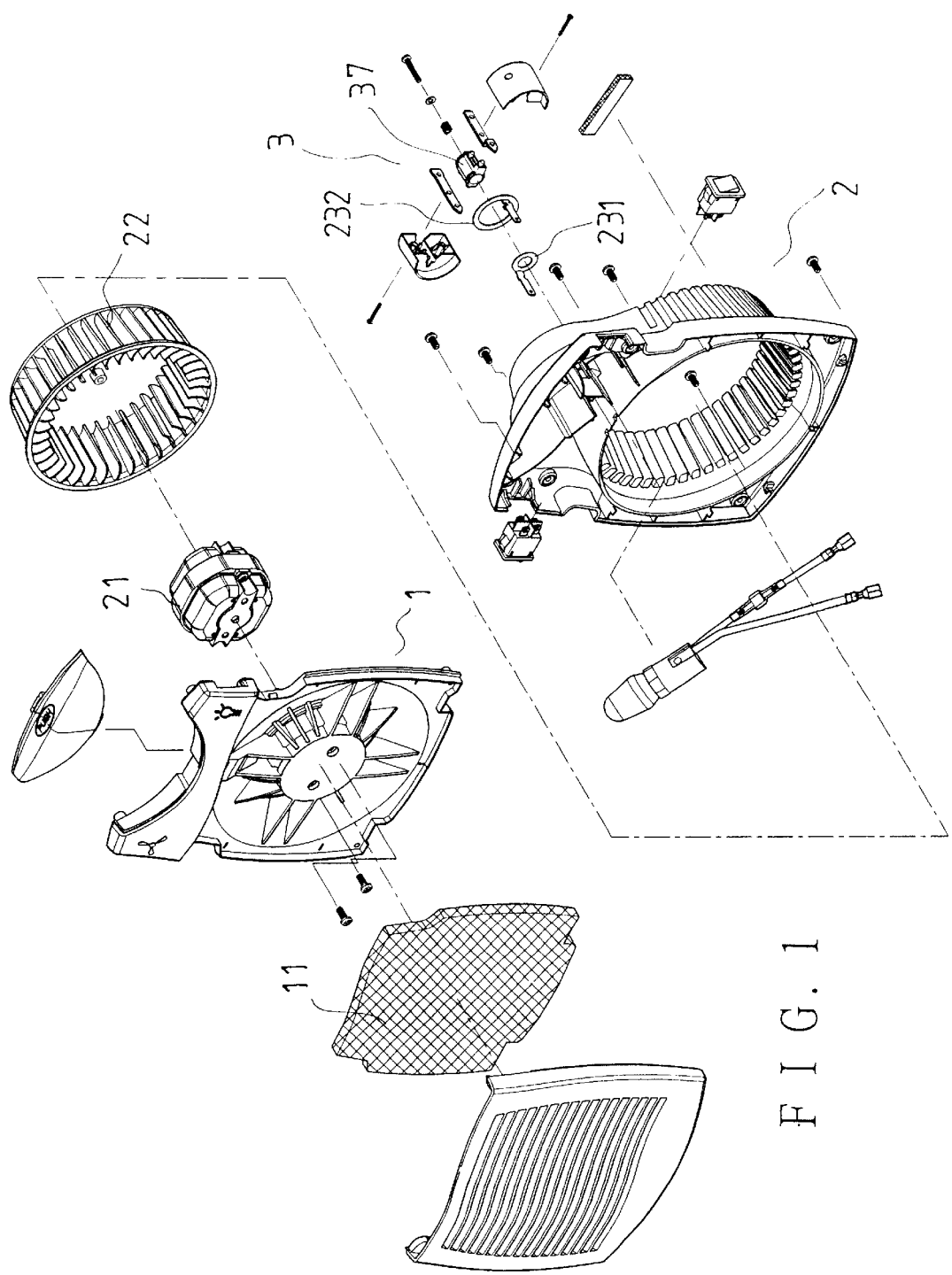
FIG. 1 is an exploded perspective view of the air purifier of the present invention.
Figure 2:
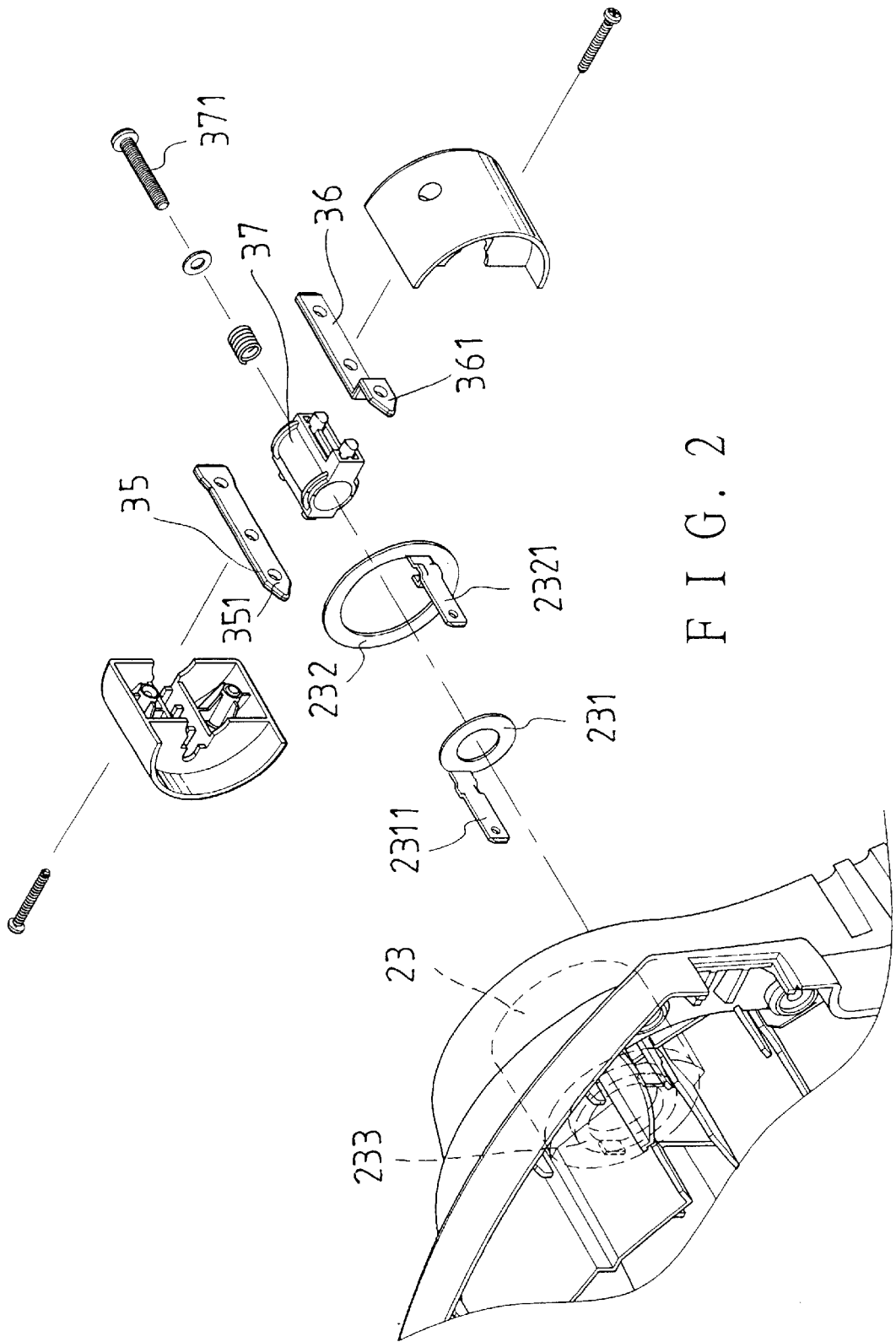
FIG. 2 is an exploded perspective view of the power plug according to the present invention.
Figure 4:
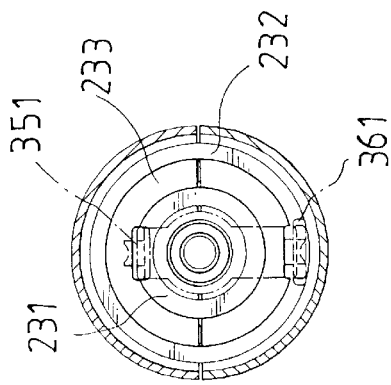
FIG. 4 is a cross-sectional view of the power plug in FIG. 3 in the rotating movement.
Figure 5:
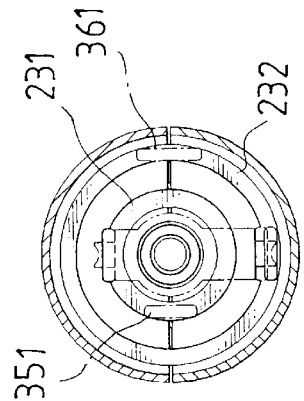
FIG. 5 is another cross-sectional view of the power plug in FIG. 3 in the rotating movement.

Referring to FIGS. 1 and 2, an air purifier of the present invention includes a main body 1, a filtering net 11, a motor 21, an fan 22, and a rear housing 2 like the conventional air purifier, and has a power plug 3, in which the improvement exists.

The power plug 3 includes a rotatable member, which consists of a pair of copper strips 35 and 36, a sleeve 37, and a pair of conductive members 231 and 232. The copper strips 35 and 36 are fastened to the sleeve 37, and is connected to a casing (not numbered) with the outer ends sticking out from one end of the casing and the inner ends 351 and 361 sticking out from the other end of the casing. The conductive members 231 and 232 each has a straight portion 2311 and 2321, and a ring-shaped portion connected to the straight portion 2311 and 2321, the outer diameter of the ring-shaped portion of the member 231 is smaller than the internal diameter of the ring-shaped portion of the member 232.

Figure 3:
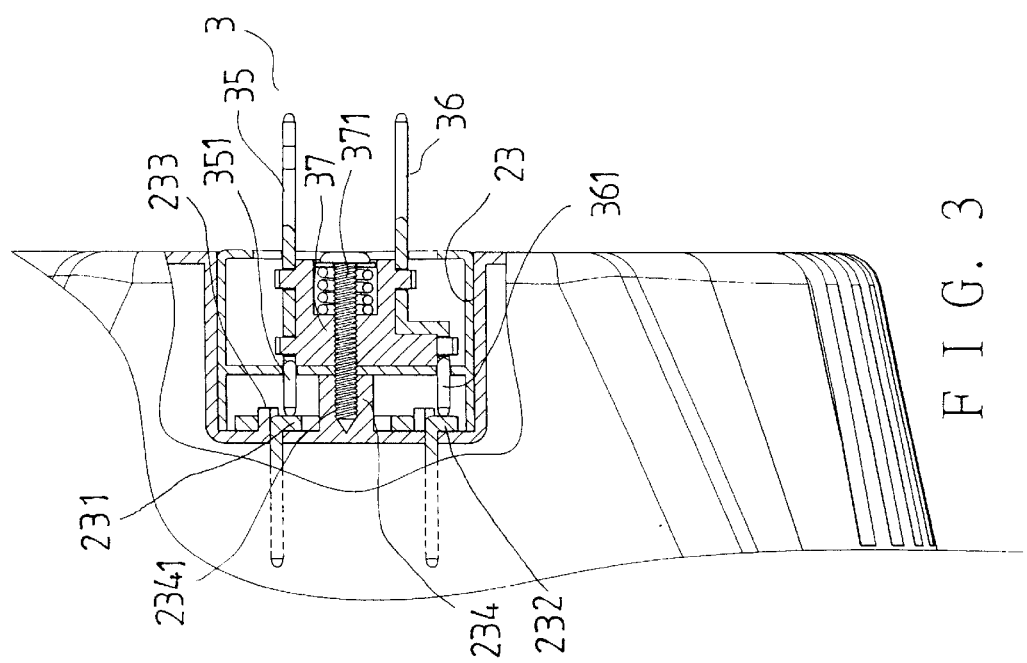
FIG. 3 is a fragmentary cross-sectional view of the air purifier of the present invention.
Figure 6:
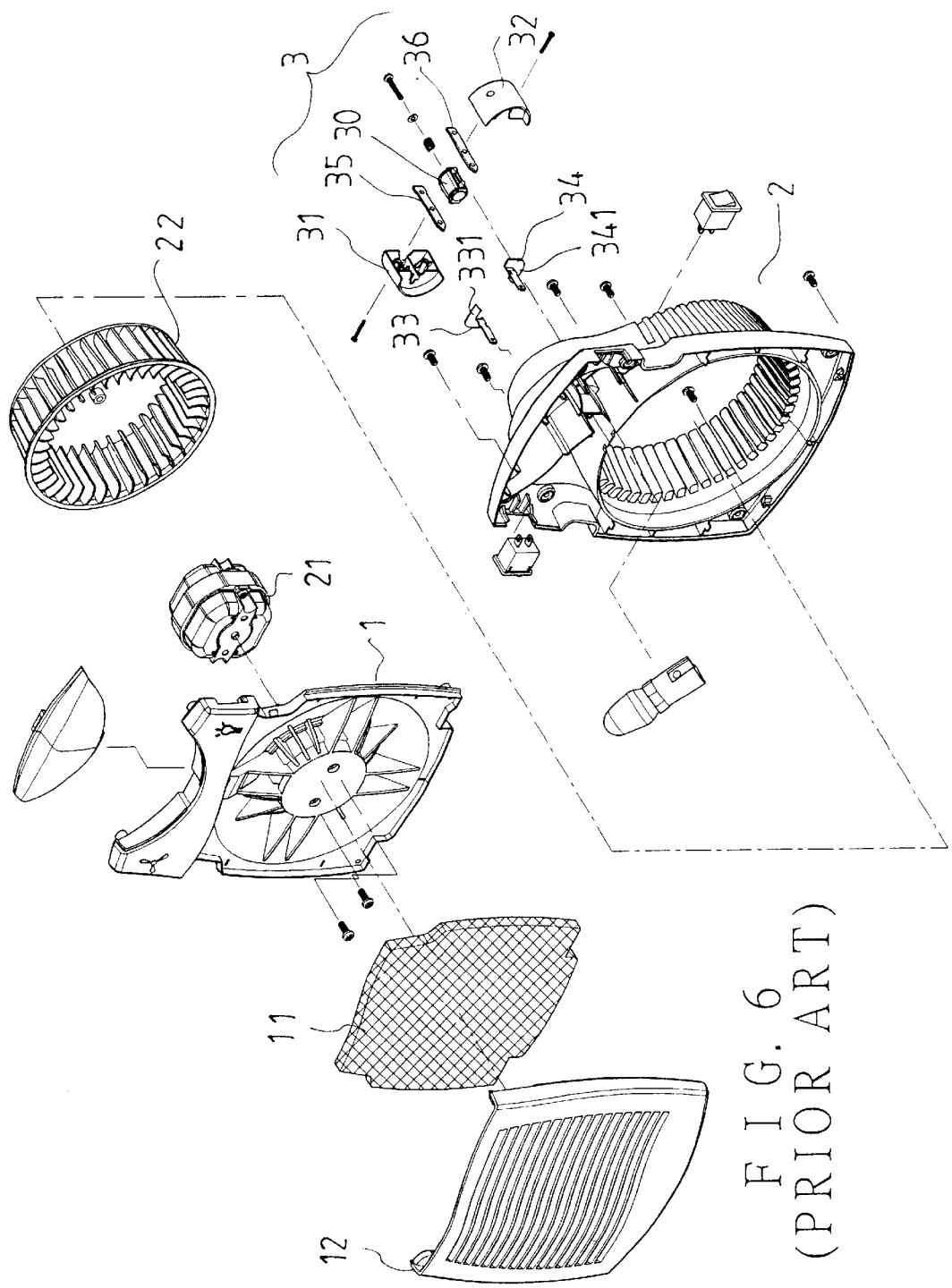
FIG. 6 is an exploded perspective view of the air purifier in the Background.

Referring to FIGS. 2 and 3, rear housing 2 is formed with a chamber 23, which has an annular protrusion 233 on a bottom wall, and a pivotal post 234 sticking out from the center of the bottom wall.

The conductive members 231 and 232 are secured to the rear housing 2 with the straight portions 2311 and 2321 passing through the bottom wall of the chamber 23 to be electrically connected to the motor 21 and with the ring-shaped portion of the member 232 being mounted around the annular protrusion 233 and the ring-shaped portion of the member 231 being fitted into the annular protrusion 233. Thus, the ring-shaped portions are concentrically arranged, and the conductive members 231 and 232 are kept away from each other.

The casing joined to the copper strips 35, 36 is rotatably received in the chamber 23 with the sleeve 37 being mounted around the pivotal post 234 in the chamber 23; the inner end 351 of the copper strip 35 gets into contact with the ring-shaped portion of the conductive member 231; the inner end 361 of the copper strip 36 is folded such that it can get into contact with the ring-shaped portion of the member 232; a bolt 371 is passed through the sleeve 37, and screwed into a screw hole 2341 of the post 234 in order to prevent the sleeve 37 from falling out.

In using the air purifier, the copper strips 35 and 36 and the sleeve 37 is turned to a suitable position, and then the copper strips 35 and 36 are plugged into a power socket to activate the motor 21. Because the inner ends 351 and 361 of the copper strips 35 and 36 constantly touch the ring-shaped portions of the conductive members 231 and 232 respectively in the turning movement of the copper strips 35 and 36, shortcircuit of the air purifier cannot happen.

From the above description, it can be easily seen that the sleeve 37 and the copper strips 35 and 36 can be rotated to any position relative to the main body of the air purifier according to the need without the risk of causing a shortcircuit, in other rods, the range of adjustment is bigger than that of the conventional air purifier in the Background.

What is claimed is:

1. An air purifier comprising:

a motor positioned in a housing equipped with a filtering net on a front side; said air purifier having a fan connected to said motor for forcing air therethrough;

a power plug formed in angularly adjustable manner on said housing, said power plug including a rotatable member and a pair of conductive members;

said conductive members having respective ring-shaped portions concentrically arranged in a chamber of said housing and being electrically connected to said motor; said rotatable member being rotatably received in said chamber;

said rotatable member having a pair of conductive strips extending from said chamber at outer ends for connection with a power socket; said conductive strips having inner ends each maintaining contact with a corresponding one of said ring-shaped portions of said conductive members during rotation of said rotatable member.

2. The air purifier as claimed in claim 1, wherein said chamber is formed with an annular protrusion extending from a bottom wall thereof said annular protrusion being interposed between said ring-shaped portions of said conductive members for radially spacing said ring-shaped portions from each other.

3. The air purifier as claimed in claim 1, wherein said conductive members each include a straight portion projecting into said housing from said ring-shaped portion thereof.

4. The air purifier as claimed in claim 1, wherein said chamber having a pivotal post formed on a bottom wall, and said rotatable member has a sleeve interposed between said conductive strips; said sleeve being mounted in angularly displaceable manner about said pivotal post.

5. The air purifier as claimed in claim 4, wherein said sleeve is secured to said pivotal post by a bolt passing coaxially therethrough.

6. The air purifier as claimed in claim 1, wherein said inner end of at least one said conductive strip extends from an intermediate folded portion in transversely offset manner relative to said outer end thereof.

7. The air purifier as claimed in claim 1, wherein each said conductive strip is formed of a copper material.

* * * * *